(12) United States Patent
Cameron

(10) Patent No.: US 12,077,141 B2
(45) Date of Patent: Sep. 3, 2024

(54) ADAPTIVE BRAKING AND STEERING ADJUSTMENT ON A SLOPE

(71) Applicant: Ford Global Technologies, LLC, Dearborn, MI (US)

(72) Inventor: Brandon J Cameron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 17/900,045

(22) Filed: Aug. 31, 2022

(65) Prior Publication Data

US 2024/0067143 A1 Feb. 29, 2024

(51) Int. Cl.
*B60T 8/26* (2006.01)
*B60T 8/1755* (2006.01)
*B60T 8/1766* (2006.01)
*B60T 8/24* (2006.01)

(52) U.S. Cl.
CPC .......... *B60T 8/268* (2013.01); *B60T 8/17552* (2013.01); *B60T 8/1766* (2013.01); *B60T 8/246* (2013.01); *B60T 2201/04* (2013.01); *B60T 2230/02* (2013.01); *B60T 2250/03* (2013.01)

(58) Field of Classification Search
None
See application file for complete search history.

(56) References Cited

U.S. PATENT DOCUMENTS

| | | | |
|---|---|---|---|
| 6,528,959 B2 | 3/2003 | Kitano et al. | |
| 8,437,914 B2 | 5/2013 | Yu et al. | |
| 10,363,930 B2 | 7/2019 | Fairgrieve et al. | |
| 11,001,261 B2 | 5/2021 | Öberg et al. | |
| 2012/0049617 A1 * | 3/2012 | Furuyama | B60T 13/662 303/9.75 |
| 2020/0130452 A1 | 4/2020 | Rothwell et al. | |

FOREIGN PATENT DOCUMENTS

| | | | | |
|---|---|---|---|---|
| DE | 102011111085 A1 * | 3/2012 | | B60T 13/662 |
| EP | 0855318 A2 * | 7/1998 | | |
| JP | 5800092 B2 * | 10/2015 | | B60T 8/171 |
| KR | 20190086239 A * | 7/2019 | | |

* cited by examiner

*Primary Examiner* — Melanie Torres Williams
(74) *Attorney, Agent, or Firm* — Burr & Forman LLP; Lorne Forsythe

(57) ABSTRACT

A method of adaptively changing brake force distribution in a vehicle may include detecting vehicle parameters during operation of the vehicle, based on the detected vehicle parameters, determining downhill travel of the vehicle while braking and steering inputs are applied to the vehicle as an enabling condition, and responsive to detection of a trigger comprising detection of an understeer condition while the enabling condition is satisfied, executing a brake force distribution modification defining a change in distribution of brake forces between a front axle and a rear axle of the vehicle.

18 Claims, 6 Drawing Sheets ns as well as changes in that position over time. As such, the brake pedal position sensor 130 and the throttle position sensor 132 may each essentially act as a movement sensor or proximity sensor capable of measuring movement of a corresponding one of the brake pedal 120 and the throttle 122.

ADAPTIVE BRAKING AND STEERING ADJUSTMENT ON A SLOPE

TECHNICAL FIELD

Example embodiments generally relate to vehicle control algorithms and, more particularly, relate to a system and method for providing dynamic and intelligent steering and braking response when headed downhill on a slope.

BACKGROUND

Driving downhill on a slope on deformable surfaces like sand, gravel or dirt, may influence steering response. Thus, it may be desirable to develop a new approach for managing braking and/or steering responses when operating on a slope headed downhill.

BRIEF SUMMARY OF SOME EXAMPLES

In accordance with an example embodiment, a vehicle control system for a vehicle may be provided. The vehicle control system may include a sensor network comprising one or more sensors to detect vehicle parameters, and a controller operably coupled to the sensor network to detect, based on the parameters, downhill travel of the vehicle while braking and steering inputs are applied to the vehicle as an enabling condition for execution of a brake force distribution modification. The controller may execute the brake force distribution modification responsive to detection of a trigger. The trigger may include detection of an understeer condition. The brake force distribution modification may define a change in distribution of brake forces between a front axle and a rear axle of the vehicle.

In another example embodiment, a method of adaptively changing brake force distribution in a vehicle may be provided. The method may include detecting vehicle parameters during operation of the vehicle, based on the detected vehicle parameters, determining downhill travel of the vehicle while braking and steering inputs are applied to the vehicle as an enabling condition, and responsive to detection of a trigger comprising detection of an understeer condition while the enabling condition is satisfied, executing a brake force distribution modification defining a change in distribution of brake forces between a front axle and a rear axle of the vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
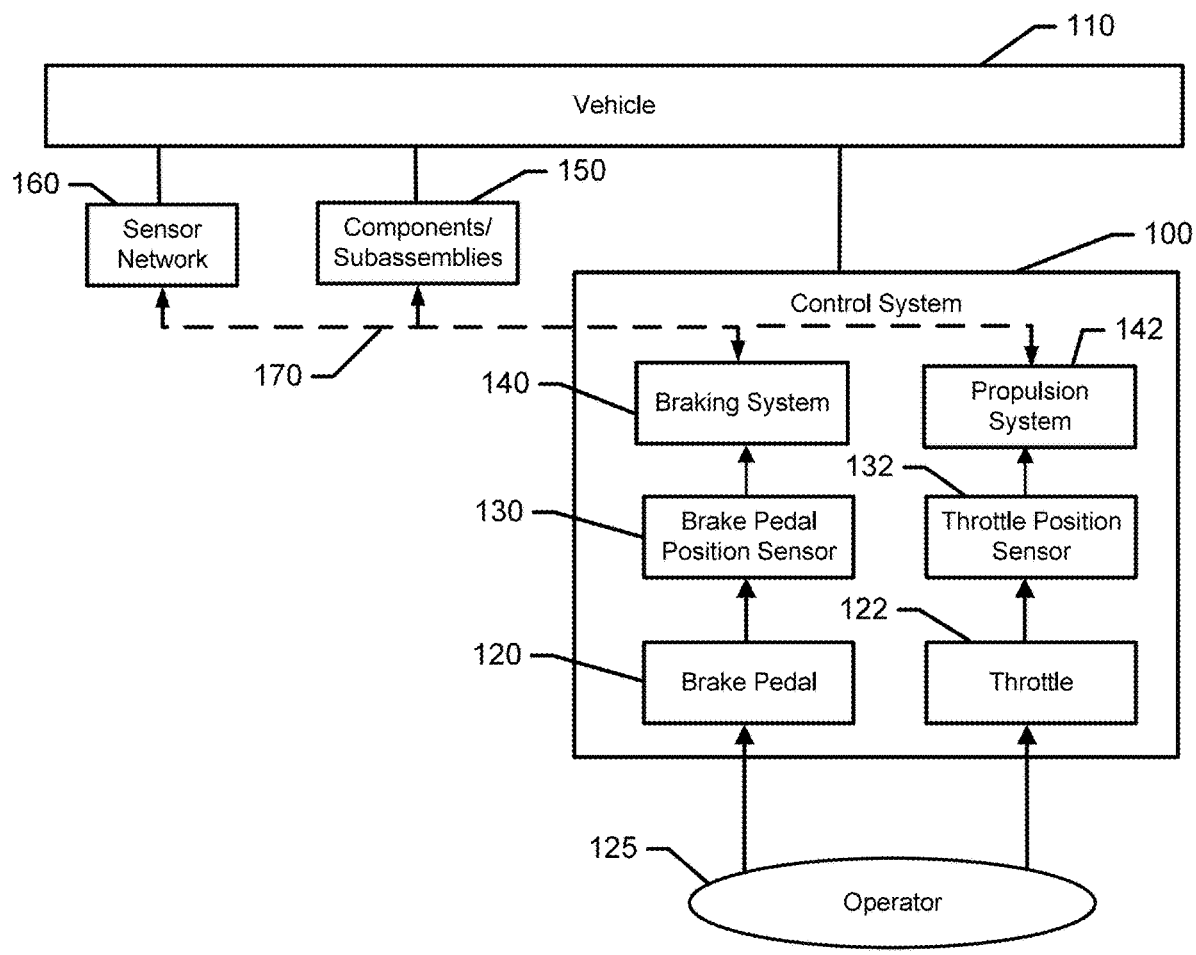
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, braking and steering responses may be influenced when operating on a downhill slope on deformable surfaces. In this regard, front wheels may tend toward an understeer condition in such situations. Example embodiments may provide a more dynamic approach to responding to these situations to counter the understeer condition.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 and a throttle 122 (e.g., a gas pedal for internal combustion engine (ICE) propulsion or speed control pedal for a battery electric vehicle (BEV) or various other hybrid or electrically powered vehicles). However, the control pedals could alternatively be hand operated or any other operable member via which an operator 125 may provide an input indicative of an intent of the operator relative to controlling net torque for application to the wheels of the vehicle 110. Moreover, some example embodiments may also be practiced in the context of autonomous vehicles. Thus, the control pedals may be completely absent (or temporarily unused) in situations where autonomous control is permanently or temporarily available for the vehicle 110.

The control system 100 may also include position sensors for each of the brake pedal 120 (which may have a corresponding brake pedal position sensor 130) and the throttle 122 (which may have a corresponding throttle position sensor 132). The brake pedal position sensor 130 and the throttle position sensor 132 may provide data indicative of the precise position of the brake pedal 120 and the throttle 122, respectively. The data indicative of pedal position may then be provided to respective ones of the a braking system 140 and a propulsion system 142, which may include components that provide for braking torque application and propulsion torque application, respectively. The braking and propulsion systems 140 and 142 may be configured to determine individual inputs of negative and positive torque (e.g., net torque) as described herein based on inputs from the brake pedal position sensor 130, the throttle position sensor 132, or other components of the vehicle 110. In some cases, the control system 100 may be configured to perform other tasks related or not related to propulsive and braking control or performance management.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170.

The components or subassemblies 150 may include, for example, components of the braking system 140, the propulsion system 142 and/or a wheel assembly of the vehicle 110 among other components/subassemblies. The braking system 140 may be structured to provide braking inputs to braking components of the vehicle 110 (e.g., electro-mechanical brakes, hydraulic brakes, regenerative brakes, use of electric wheel motors for braking, etc.) based on a braking torque determined by the torque control module 140. The braking system 140 may also include more than one type of braking hardware. For example, the braking system 140 of the vehicle 110 may include a combination of hydraulic brakes and electro-mechanical brakes. In some example embodiments, the braking system 140 may be a brake-by-wire system.

The propulsion system 142 may include a gas engine, electric motor, or any other suitable propulsion device. In some cases, the propulsion system 142 may also incorporate drive-by-wire components and a corresponding control paradigm. Thus, the vehicle 110 (using the braking system 140 and the propulsion system 142) may determine either or both of propulsive and braking torque inputs for provision to the propulsion system 142 and braking system 140 to apply the respective form of positive or negative torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, rate of change of vehicle velocity, front/rear wheel speeds, vehicle pitch, etc.

Accordingly, for example, the control system 100 may be able to receive numerous different parameters, indications and other information that may be related to or indicative of different situations or conditions associated with vehicle status. The control system 100 may also receive information indicative of the intent of the operator 125 (or autonomous control system) relative to control of various aspects of operation of the vehicle 110 and then be configured to use the information received to provide instructions to the braking system 140 and the propulsion system 142 in order to control application of net torque to the wheels of the wheel assembly of the vehicle 110. The control system 100 of FIG. 1 may be similar to conventional systems in many respects, except that, the control system 100 (and in some cases specifically the braking system 140) may be modified to dynamically provide adaptive braking when steering while traveling downhill as described in greater detail in reference to FIGS. 2-5.

Figure 2:
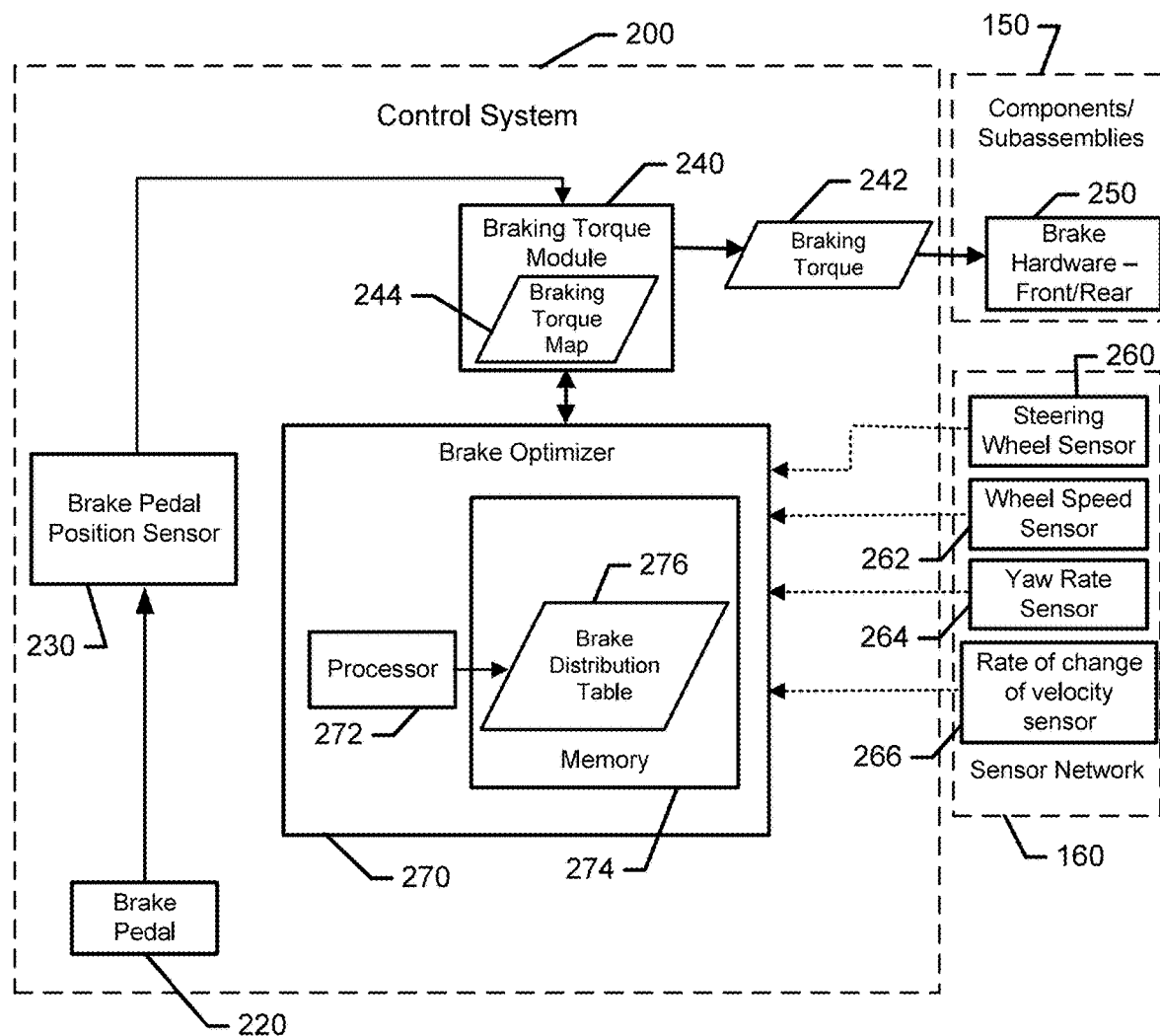
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates example interactions for the control system 200 between a brake pedal 220 (e.g., an example of brake pedal 120 of FIG. 1), a brake pedal position sensor 230 (e.g., an example of brake pedal position sensor 130 of FIG. 1), a braking torque module 240 (e.g., which generates commands or instructions for braking torque 242) and the components or subassemblies 150 relative to information received thereby (e.g., from the sensor network 160, from various ones of the components/subassemblies 150, and/or from the operator 125).

The control system 200 may include the brake pedal 220, which may have the corresponding brake pedal position sensor 230, to enable the braking torque module 240 to define the requests or commands for braking torque 242 to the braking system 140, which is embodied in part in this example by brake hardware 250, which may be understood to include braking components located at front and rear axles of the vehicle 110, respectively. The brake hardware 250 may include actuators, motors, etc. for electronic braking systems and/or drums, rotors, calipers, etc. associated with hydraulic braking systems embodying the braking system 140 of FIG. 1. In some embodiments, the control system 200 may receive an input from an operator 125 in the form of a force applied to the brake pedal 220. The control system 200 may then communicate the amount of travel of the corresponding pedal that is caused by the force applied by the operator 125 to the braking torque module 240 in the form of an electronic signal via the brake pedal position sensor 230. In some embodiments, the brake pedal position sensor 230 may include a Hall effect sensor or similar type sensor. The pedal position may then be provided to the braking torque module 240 for use as described in greater detail below. In some embodiments, pedal position may be an example of information indicative of operational intent of the operator 125.

The braking torque module 240 may be configured to receive information indicative of operational intent of the operator 125 (e.g., data from the brake pedal position sensor 230) and, in some cases, also information indicative of vehicle status (e.g., vehicle speed (or rate of change of speed in various directions), steering wheel position, wheel speed, yaw rate, and/or other parameters) from the sensor network 160. In this regard, for example, the sensor network 160 may include a steering wheel sensor 260, a wheel speed sensor 262, a yaw rate sensor 264, a rate of change of velocity sensor 266, and/or the like. Based on the operational intent and/or vehicle status, the braking torque module 240 may determine a braking torque 242 to be applied via the brake hardware 250 of the vehicle 110. In other words, braking torque 242 may be considered to be representative of a braking torque request, or a request for a corresponding determined amount of braking torque 242. The braking torque module 240 may determine the braking torque 242 using a braking torque map 244, which may be constructed to balance the information indicative of vehicle status with the information indicative of operational intent of the operator 125 in order to infer the desired braking torque 242 of the operator 125. In an example embodiment, the braking torque map 244 may be generated or otherwise provided by the manufacturer. The braking torque map 244 may be generated based on test data gathered over many hours of testing in numerous different conditions and situations. In some cases, the braking torque map 244 may provide a mapping of brake pedal positions (e.g., as detected by the brake pedal position sensor 230) to corresponding braking torque 242 values to provide to the EBM components 250. Thus, for example, the full range of pedal positions may be mapped to corresponding values of the braking torque 242.

In some embodiments, the braking torque map 244 may further define brake force distributions between the braking components located at the front axle and the braking components located at the rear axle. The braking torque map 244 may, in some cases, define a total brake force to be applied in each respective situation that is mapped, and such total brake force may then be split between the front and rear axle of the vehicle 110 based on a nominal brake force distribution. Although not required, an example of a typical nominal brake force distribution may be a 70/30 split with 70% of the total brake force defined at any given moment being applied to the front brakes (e.g., the braking components located at the front axle) and the remaining 30% of the total brake force defined at the given moment being applied to the rear brakes (e.g., the braking components located at the rear axle).

As discussed above, when driving downhill while both braking and steering, an understeer condition may be experienced. The understeer condition may be more pronounced when the downhill driving occurs on a deformable surface such as sand, gravel, or dirt. Given the weight distribution of the vehicle 110 on the front axle, and the fact that the normal brake force distribution typically favors application of braking forces at the front axle, a condition in which the front wheels are "washed out" may occur. Example embodiments may correct for this condition may adjusting the brake force distribution dynamically and intelligently. To accomplish this, a brake optimizer module 270 may be provided.

The brake optimizer module 270 may include processing circuitry (e.g., a processor 272 and memory 274) that is programmable to update and maintain a brake distribution table 276 that defines adjustments from the nominal brake force distribution based on the various parameters detected by the sensor network 160. In this regard, for example, the brake distribution table 276 may be stored in the memory 274, and may be configured (e.g., via the processor 272) to provide a modification of the distribution of the braking torque 242 defined by the braking torque map 244 between front and rear axles that is potentially different than the nominal brake force distribution. In other words, whereas the total torque value that is prescribed by the braking torque module 240 may be unchanged, the distribution of that prescribed total torque value may be modified so that different percentages of the total torque are applied to front and rear axles than would be the case under the nominal brake force distribution.

In some example embodiments, the modification may typically be to shift brake torque distribution rearward while on the downhill slope. Thus, for example, whereas the nominal brake force distribution may be 70/30 front to rear, the modification may be 20/80 front to rear, or 30/70 front to rear (or any other suitable distribution). The basic operation of the brake optimizer module 270 is therefore relatively straightforward, so that what the brake optimizer module 270 does is fairly simple. When and how it does what it does may vary in different example embodiments. However, some non-limiting examples will now be described to explain when and how the brake optimizer module 270 may operate in some cases.

In this regard, the brake optimizer module 270 may be configured to become active only under specific circumstances, which may enable and/or trigger the operation of the brake optimizer module 270. These circumstances, as noted above, may include downhill travel while braking and experiencing understeer. The detection of braking may be very simple in that an input from the brake pedal position sensor 230 (either directly or via the braking torque module 240) may indicate when this condition is met. Downhill travel may be determined by global positioning system (GPS), inertial sensors, or by measuring directional movement trends. Thus, for example, the rate of change of velocity sensor 266 may be used among other devices (e.g., a gyro, inertial measurement unit (IMU), etc.) to indicate operation on a downward slope. Pitch may be inferred from longitudinal and vertical rates of change of velocity. These two conditions (i.e., operation on a downward slope and braking) may be considered enabling conditions that must be met before a trigger condition (i.e., experiencing understeer) causes the brake force distribution to be modified.

Notably, the terms "enabling condition" and "trigger" are merely used to distinguish the different conditions in this case, and are not themselves to be considered limiting, or even to define a necessary order in which the conditions must be detected. Any time all three conditions are detected (regardless of the ordering of their occurrence), the brake optimizer module 270 may operate in some embodiments. That said, in some cases, whatever the first two conditions to be detected may be, those first two conditions may be considered enabling, and the last condition to be detected may be considered to be the trigger. In most cases, the last condition to be detected will be the understeer condition, and that is why the understeer condition is considered the trigger in the example discussed herein.

Understeer may be detected in a number of different ways. In some cases, the yaw rate sensor 264 may be employed to facilitate detection of understeer. For example, the processing circuitry may employ an algorithm for detecting understeer that employs a model to which actual conditions may be employed. In an example embodiment, the model may be a stability control bicycle model for the vehicle 110, which may be compared to the actual yaw rate of the vehicle 110 as determined by the yaw rate sensor 264 to determine whether understeer is being experienced. Detection of slip (and particularly detecting different amounts of slip between the front and rear axles (or wheels thereon)) may also facilitate a determination of understeer. Detection of slip may also be used to determine when the surface being operated on is a deformable surface. Thus, for example, determining that the vehicle 110 is operating on a deformable surface could be a fourth condition that may be enabling or triggering with respect to operation of the brake optimizer module 270 in some cases.

Figure 3:
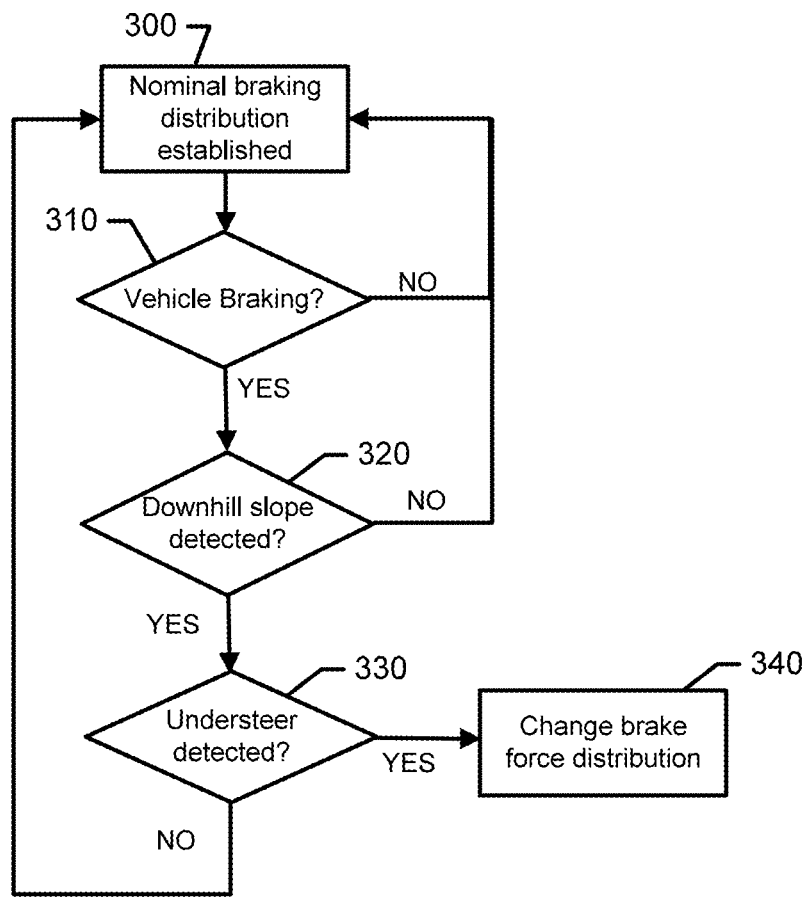
FIG. 3 illustrates a block diagram of a process or algorithm for adjusting braking distribution in accordance with an example embodiment.

FIG. 3 illustrates a block diagram of a process or algorithm for implementing dynamic brake force distribution adjustment according to an example embodiment. Thus, for example, the control system 200 may monitor parameters detected during vehicle operation and execute the process of FIG. 3 accordingly. As shown at operation 300, a nominal braking distribution may initially be established (for employment with each application of braking torque). The algorithm may then monitor for the three conditions noted above including vehicle braking (at operation 310), downhill slope operation (at operation 320) and detection of understeer (at operation 330). As noted above, these three conditions may occur in any order, and it is only when all three occur simultaneously that the change in brake force distribution of operation 340 is executed. If any one of the three conditions is not met at any time, control flow returns to operation 300 for continuous monitoring for the three conditions.

Figure 4:
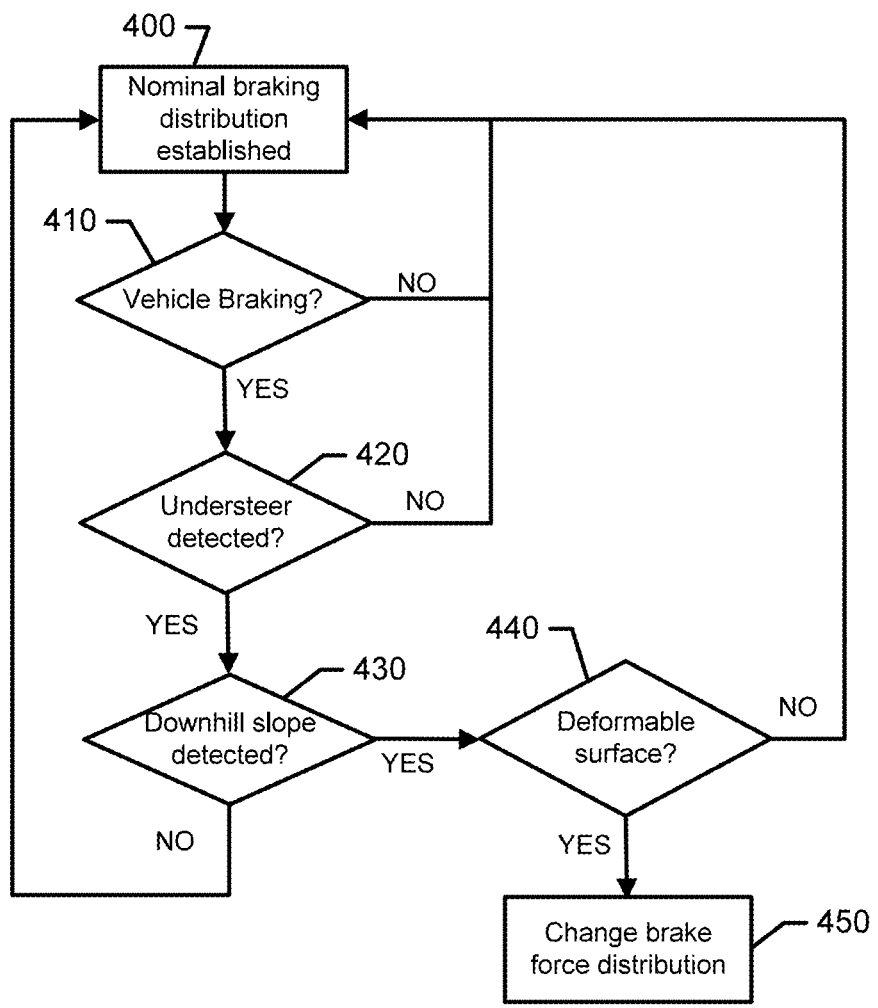
FIG. 4 illustrates a block diagram of a process or algorithm for dynamically adjusting braking distribution in an alternative way to that of FIG. 3 according to an example embodiment.

As noted above, in some cases, a fourth condition may further be monitored for to cause brake for distribution modification. FIG. 4 illustrates a block diagram of an example process or algorithm that includes this fourth condition. In this regard, similar to FIG. 3, at operation 400, a nominal braking distribution may initially be established (for employment with each application of braking torque). The algorithm may then monitor for the four conditions noted above including vehicle braking (at operation 410), downhill slope operation (at operation 430), detection of understeer (at operation 420), and operation on a deformable surface (at operation 440). These four conditions may occur in any order, and it is only when all four occur simultaneously that the change in brake force distribution of operation 450 is executed. If any one of the four conditions is not met at any time, control flow returns to operation 400 for continuous monitoring for the four conditions.

Figure 5:
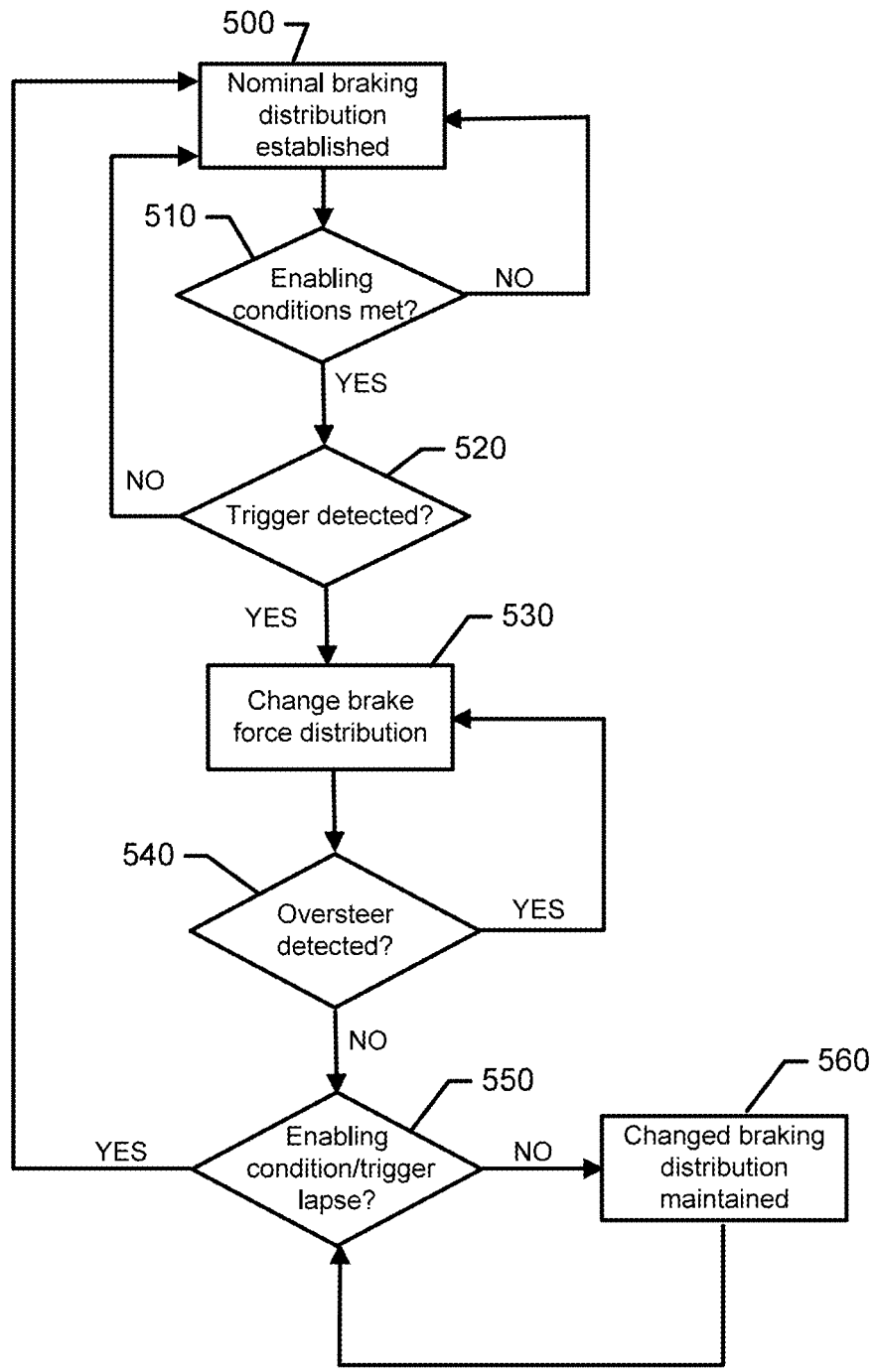
FIG. 5 illustrates a block diagram of a process or algorithm for adjusting braking distribution that includes closed loop feedback in accordance with an example embodiment.

In some embodiments, the adjustment or change in brake distribution may be conducted "live" during the braking event, and a closed feedback loop may be defined to optimize brake balancing between front and rear axles. FIG. 5 shows a block diagram of a process or algorithm that includes closed loop feedback provision for brake balancing optimization. As shown at operation 500, a nominal braking distribution may initially be established (for employment with each application of braking torque). The algorithm may then monitor for enabling conditions (whatever they may be) at operation 510. If the enabling conditions are met, then responsive to detection of the trigger (e.g., the last of the conditions) at operation 520, a change to the brake force distribution may be made at operation 530. Similar to the processes shown in FIGS. 3 and 4, if any enabling condition or the trigger is not detected, monitoring will continue until all such conditions are simultaneously detected.

After the change to brake force distribution (typically to increase brake force distribution at the rear axle and decrease brake force distribution at the front axle), monitoring of the amount of understeer may be detected to confirm a reduction. In some cases, the reduction may, however, actually be so significant that oversteer may result. If oversteer is detected at operation 540, then brake force distribution may be changed again (e.g., returning to operation 540) to attempt to eliminate oversteer. However, if oversteer is not detected, then a determination may be made as to whether any one of the enabling or trigger conditions lapses at operation 550. For as long as all such conditions (i.e., enabling and trigger conditions) are simultaneously present, the current changed braking distribution may be maintained at operation 560. However, as soon as one of the conditions lapses, the nominal brake force distribution may be initiated again at operation 500, and the monitoring cycle may continue. Additionally, in some embodiments, the functions described above may nevertheless always provide the total braking force requested by the driver via the brake pedal. Thus, only the distribution of that total braking force may be adjusted by example embodiments.

Figure 6:
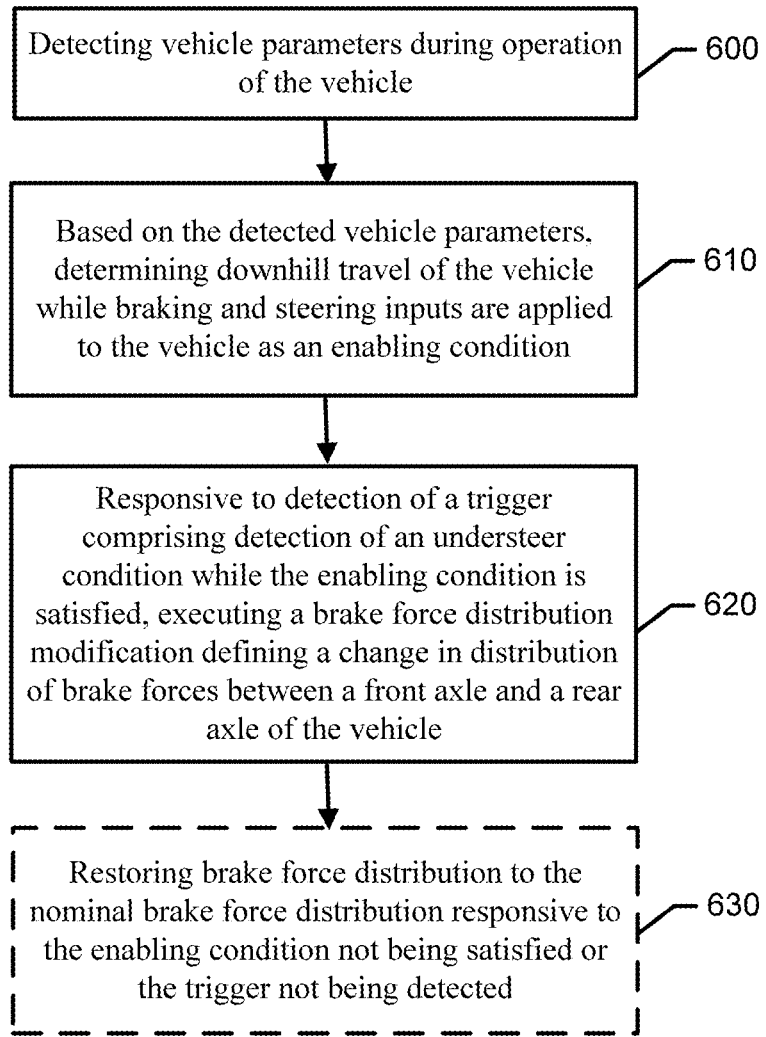
FIG. 6 illustrates a method of adaptively changing brake force distribution in a vehicle according to an example embodiment.

A method of adaptively changing brake force distribution in a vehicle is shown in the block diagram of FIG. 6, and a vehicle control system for practicing the method may therefore also be provided. The system may include a brake optimizer module operably coupled brake hardware (at front and rear axles) of the vehicle to provide braking force or braking torque to the front and rear axles that is distributed between the front axle and the rear axle of the vehicle strategically based on parameters sensed by a sensor network. The brake optimizer may be configured to perform the method, which may include detecting vehicle parameters during operation of the vehicle at operation 600. The method may further include, based on the detected vehicle parameters, determining downhill travel of the vehicle while braking and steering inputs are applied to the vehicle as an enabling condition at operation 610 and, responsive to detection of a trigger comprising detection of an understeer condition while the enabling condition is satisfied, executing a brake force distribution modification defining a change in distribution of brake forces between a front axle and a rear axle of the vehicle at operation 620.

The method and system of some embodiments may include additional operations, features, modifications, augmentations and/or the like to achieve further objectives or enhance performance of the system. The additional operations, features, modifications, augmentations and/or the like may be added in any combination with each other. Below is a list of various additional operations, features, modifications, and augmentations that can each be added individually or in any combination with each other. For example, the method may further include restoring brake force distribution to a nominal brake force distribution responsive to the enabling condition not being satisfied, detection of oversteer, or the trigger not being detected at operation 630. In an example embodiment, detection of the understeer condition may be performed based on detecting wheel slip and yaw rate. In some cases, detecting wheel slip may include detecting a differential in wheel slip at the front axle relative to the rear axle. In an example embodiment, adjusting the distribution of brake forces comprises increasing brake torque to the rear axle and decreasing brake torque to the front axle relative to the nominal brake force distribution. In some cases, the nominal brake force distribution may have a higher force distribution to the front axle than the rear axle, and the change in distribution of brake forces may result in a lower force distribution to the front axle than the rear axle. In an example embodiment, the change in distribution of brake forces may include changing a percentage of total braking torque that is applied to each of the front and rear axles without changing the total braking torque. In some cases, the change in distribution of brake forces may be determined by referencing a brake distribution table. In an example embodiment, detecting vehicle parameters may include detecting that the vehicle is operating on a deformable surface, and operating on the deformable surface may also be required to satisfy the enabling condition. In some cases, responsive to executing the brake force distribution modification, an amount of understeer is determined and adjusted (e.g., to prevent or minimize oversteer) in closed loop fashion by further adjustment to the brake force distribution.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of adaptively changing brake force distribution in a vehicle, the method comprising:
   detecting vehicle parameters during operation of the vehicle;
   based on the detected vehicle parameters, determining downhill travel of the vehicle while braking and steering inputs are applied to the vehicle as an enabling condition; and
   responsive to detection of a trigger comprising detection of an understeer condition while the enabling condition is satisfied, executing a brake force distribution modification defining a change in distribution of brake forces between a front axle and a rear axle of the vehicle,
   wherein the change in distribution of brake forces comprises changing a percentage of total braking torque that is applied to each of the front and rear axles without changing the total braking torque.

2. The method of claim 1, wherein detection of the understeer condition is performed based on detecting wheel slip and yaw rate.

3. The method of claim 2, wherein detecting wheel slip comprises detecting a differential in wheel slip at the front axle relative to the rear axle.

4. The method of claim 1, wherein adjusting the distribution of brake forces comprises increasing brake torque to the rear axle and decreasing brake torque to the front axle relative to a nominal brake force distribution.

5. The method of claim 4, further comprising restoring brake force distribution to the nominal brake force distribution responsive to the enabling condition not being satisfied, detection of oversteer, or the trigger not being detected.

6. The method of claim 4, wherein the nominal brake force distribution has a higher force distribution to the front axle than the rear axle, and
   wherein the change in distribution of brake forces results in a lower force distribution to the front axle than the rear axle.

7. The method of claim 1, wherein the change in distribution of brake forces is determined by referencing a brake distribution table.

8. The method of claim 1, wherein, responsive to executing the brake force distribution modification, an amount of understeer is determined and adjusted in closed loop fashion by further adjustment to the brake force distribution.

9. A method of adaptively changing brake force distribution in a vehicle, the method comprising:
   detecting vehicle parameters during operation of the vehicle;
   based on the detected vehicle parameters, determining downhill travel of the vehicle while braking and steering inputs are applied to the vehicle as an enabling condition; and
   responsive to detection of a trigger comprising detection of an understeer condition while the enabling condition is satisfied, executing a brake force distribution modification defining a change in distribution of brake forces between a front axle and a rear axle of the vehicle,
   wherein detecting vehicle parameters comprises detecting that the vehicle is operating on a deformable surface, and wherein operating on the deformable surface is also required to satisfy the enabling condition.

10. A vehicle control system comprising:
    a sensor network comprising one or more sensors to detect vehicle parameters; and
    a controller operably coupled to the sensor network to detect, based on the parameters, downhill travel of the vehicle while braking and steering inputs are applied to the vehicle as an enabling condition for execution of a brake force distribution modification,
    wherein the controller executes the brake force distribution modification responsive to detection of a trigger, the trigger comprising detection of an understeer condition,
    wherein the brake force distribution modification defines a change in distribution of brake forces between a front axle and a rear axle of the vehicle, and
    wherein the change in distribution of brake forces comprises changing a percentage of total braking torque that is applied to each of the front and rear axles without changing the total braking torque.

11. The vehicle control system of claim 10, wherein detection of the understeer condition is performed based on detecting wheel slip and yaw rate.

12. The vehicle control system of claim 11, wherein detecting wheel slip comprises detecting a differential in wheel slip at the front axle relative to the rear axle.

13. The vehicle control system of claim 10, wherein adjusting the distribution of brake forces comprises increasing brake torque to the rear axle and decreasing brake torque to the front axle relative to a nominal brake force distribution.

14. The vehicle control system of claim 13, wherein the controller further restores brake force distribution to the nominal brake force distribution responsive to the enabling condition not being satisfied, detection of oversteer, or the trigger not being detected.

15. The vehicle control system of claim 13, wherein the nominal brake force distribution has a higher force distribution to the front axle than the rear axle, and
    wherein the change in distribution of brake forces results in a lower force distribution to the front axle than the rear axle.

16. The vehicle control system of claim 10, wherein the change in distribution of brake forces is determined by referencing a brake distribution table.

17. The vehicle control system of claim 10, wherein detecting vehicle parameters comprises detecting that the vehicle is operating on a deformable surface, and wherein operating on the deformable surface is also required to satisfy the enabling condition.

18. The vehicle control system of claim 10, wherein, responsive to executing the brake force distribution modification, an amount of understeer is determined and adjusted in closed loop fashion by further adjustment to the brake force distribution.

* * * * *